July 7, 1936.   F. BENTZ   2,046,316
AUTO BRAKE
Filed June 23, 1933   2 Sheets-Sheet 1
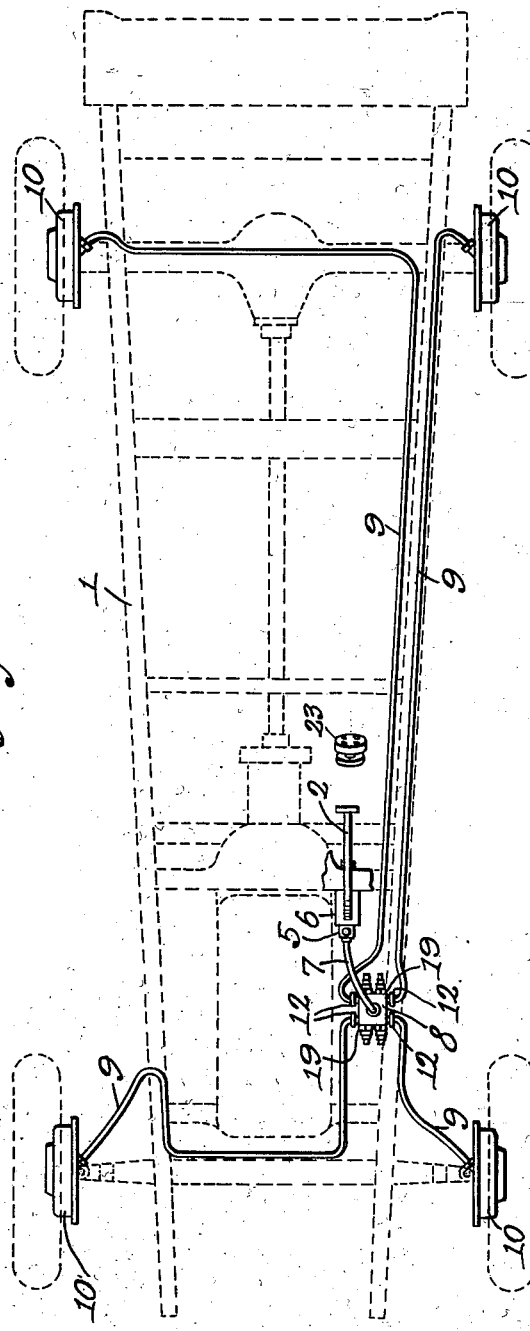
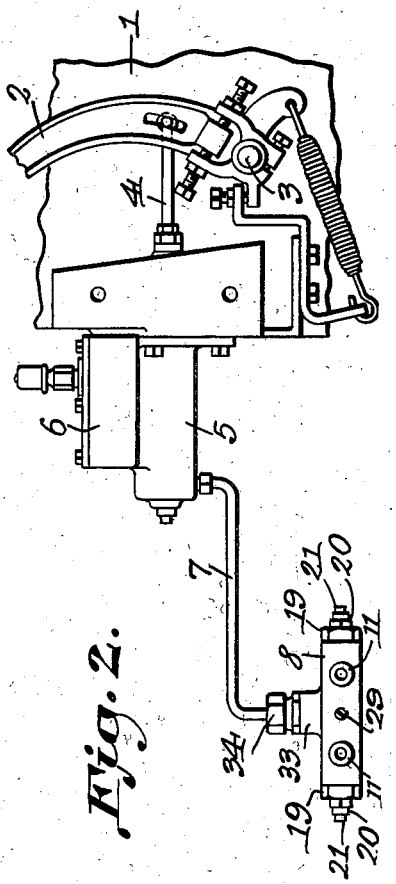
F. Bentz Inventor July 7, 1936.    F. BENTZ    2,046,316
AUTO BRAKE
Filed June 23, 1933    2 Sheets-Sheet 2
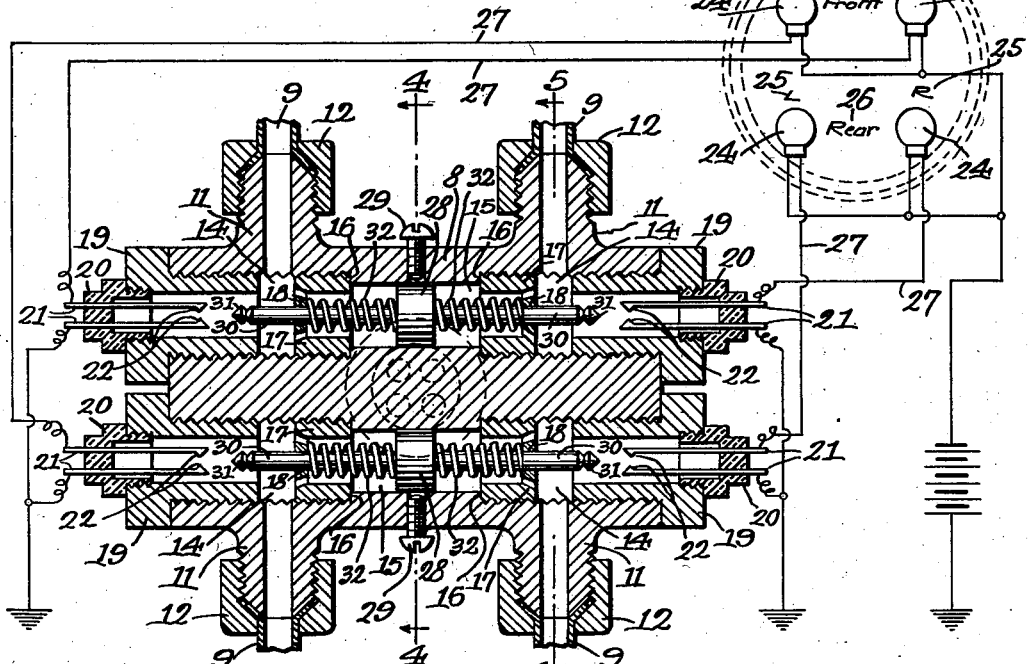
Fig. 3.
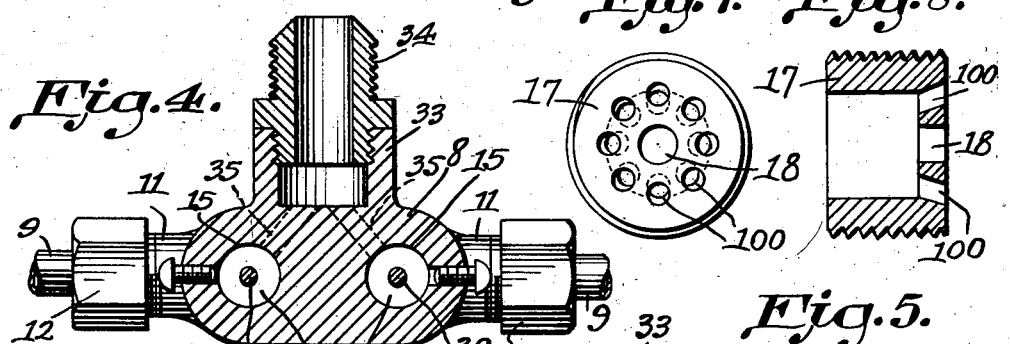
Fig. 4.    Fig. 7.    Fig. 8.
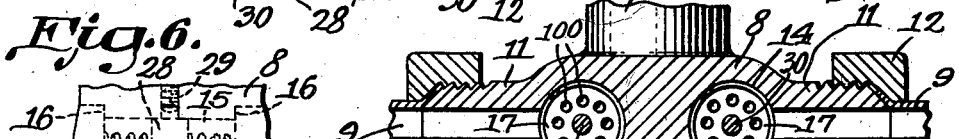
Fig. 6.    Fig. 5.
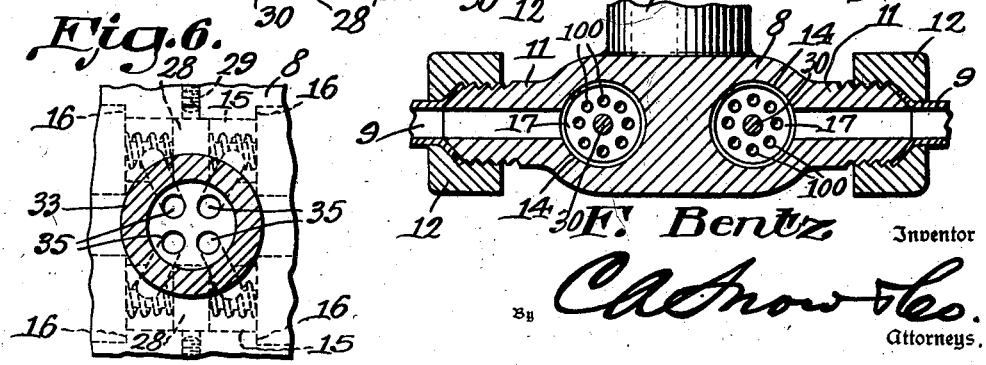
F. Bentz, Inventor
By C. A. Snow & Co.
Attorneys.

Patented July 7, 1936

2,046,316

UNITED STATES PATENT OFFICE 2,046,316

AUTO BRAKE

Fred Bentz, Temple, Tex.

Application June 23, 1933, Serial No. 677,313

1 Claim. (Cl. 303—84)

This invention aims to provide a simple means whereby, when any one hydraulic wheel brake on a motor-propelled vehicle becomes inoperative, that brake will be cut out, the remaining brakes continuing to function, and a signal being given, to indicate the particular brake which has played out.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows diagrammatically, and in top plan, a portion of a motor-propelled vehicle to which the device forming the subject matter of this application has been applied;

Fig. 2 is a side elevation, showing the device forming the subject matter of this application, in relation to the brake pedal;

Fig. 3 is a vertical longitudinal section of the device hereinafter described and claimed, the signal mechanism being added diagrammatically;

Fig. 4 is a transverse section on the line 4—4 of Fig. 3;

Fig. 5 is a transverse section on the line 5—5 of Fig. 3;

Fig. 6 is a horizontal transverse section taken through the inlet;

Fig. 7 is an end elevation of the valve seat or guide;

Fig. 8 is a longitudinal section of the valve seat or guide.

In Fig. 1 and in Fig. 2 there is shown a portion 1 of the frame of an automobile. The brake pedal is indicated at 2 and is movably mounted at 3, in the usual way. The brake pedal 2 is operatively connected at 4 with the master cylinder 5, the fluid reservoir being shown at 6.

A conduit 7 connects the master cylinder 5 with the casing 8 of the device forming the subject matter of this application. Conduits 9 connect the casing 8 with the hydraulic brakes 10 which are individual to the several wheels of the vehicle.

Describing in detail the structure which characterizes the present invention, Fig. 3 shows that the casing 8 has side nipples 11, to which the conduits 9 are connected by threaded couplings 12. In its ends, the casing 8 has threaded longitudinal bores 14, with which the nipples 11 communicate. The threaded bores 14 of each longitudinal pair are connected by cylinder bores 15, somewhat smaller than the bores 14, so as to form internal shoulders 16 in the casing 8.

Cup-shaped valve seats and guides 17 are threaded into the bores 14 and abut against the shoulders 16, there being a valve seat at each end of each cylinder 15. In their outer ends, the valve seats 17 have openings 18, around which are arranged other openings 100, the openings 100 being tapered.

Sleeves 19 are threaded into the outer ends of the bores 14, the inner ends of the sleeves 19 being spaced from the valve seats and guides 17 longitudinally of the casing 8, so that there is a communication between the openings 18 of the valve seats and guides and the nipples 11. In the outer ends of the sleeves 19, insulating members 20 are threaded, or mounted otherwise.

The insulating members 20 carry latches 21, such as spring fingers, projecting within the sleeves 19. At their inner ends, the latches 21 have teeth 22 which project toward each other. At any suitable place on the vehicle, for instance on the instrument board (not shown) is mounted a signal casing 23, which is diagrammatically indicated in Fig. 3 of the drawings. This signal casing 23 carries a plurality of signals, such as electric lamps 24, shown in Fig. 3. There is one lamp 24 for each of the four wheel brakes 10. Each of the lamps 24 is appropriately marked, as shown at 25 in Fig. 3, to designate whether that lamp is a left lamp or a right lamp, and each pair of lamps, considered with respect to the front and the back, is marked as shown at 26 in Fig. 3, to indicate whether the pair under consideration is a front pair or a back pair. The lamps 24 are wired individually, as indicated at 27, to each pair of the latches 21. It is unnecessary to trace out the circuits in detail, since they are very simple and amply shown in Fig. 3 of the drawings, this specification being addressed to a person skilled in the art.

Pistons 28 are mounted to reciprocate in the cylinders 15. The pistons 28 ordinarily reciprocate freely, and are automatic in operation, but when it is desired to hold the pistons 28 fixed, for the purpose of bleeding the brake system, this may be done through the instrumentality of holding devices, such as screws 29, threaded into the casing 8, and adapted to be engaged with the pistons 28. The pistons 28 have oppositely-projecting stems, 30, slidably mounted in the openings 18 in the valve seats and guides 17. At their outer ends, the stems 30 of the pistons 28 have heads 31, adapted to be grasped by the teeth 22 of the resilient latches 21. Compression springs 32 surround the piston stems 30. At their inner ends, the springs 32 abut against the pistons 28, and at their outer ends, the springs abut against the valve seats and guides 17, the parts 17 being hollow or cup-shaped, so as to receive the springs, when the springs are compressed. The pistons 28 function as valves, adapted to open and close the openings 100 in the valve seats and guides 17.

Intermediate its ends, the casing 8 is supplied with an inlet nipple 33, which is joined by a coupling 34 to the conduit 7 of Fig. 1. In the casing 8 there are passages 35. These passages 35 communicate at their outer ends with the inlet nipple 33, but at their inner ends, the said passages communicate with the cylinders 15, on opposite sides of the pistons 28: that is, one passage 35 leads to one side of one piston 28, and another passage leads to the opposite side of the same piston.

If any one of the brake mechanisms 10 of Fig. 1 proves inoperative, the pressure on the corresponding side of one of the pistons 28 in Fig. 3 is relieved, and that piston, say the uppermost piston in Fig. 3, being no longer balanced by equal pressures on both sides of it, moves to the right and abuts against the corresponding member 17, thereby closing the openings 100 and cutting out the brake mechanism 10 which has become inoperative, since no fluid can pass from the left hand side of the uppermost piston in Fig. 3, through the corresponding openings 100 in the member 17, to the nipple 11, and to the corresponding conduit 9. The remaining brake mechanisms, obviously, remain operative.

When the piston 28 moves outwardly, the head 31 on its stem 30 is engaged by the teeth 22 of the latches 21, and the piston 28 is held, by the pressure behind the piston, in contact with the valve seat 17, against the action of the corresponding compression spring 32. The function of the springs 32 is to aid in maintaining the piston 28 in the centralized, balanced, or normally open position of Fig. 3.

When the head 31 of the stem 30 of the piston 28 engages with one pair of the spring latches 21, the corresponding lamp circuit is closed, and one of the lamps 24 is lighted, the driver thus being admonished that one of the brake mechanisms 10 has played out, the driver also being advised as to the particular brake which no longer is fulfilling its purpose.

When the pressure to the left of the uppermost piston 28 in Fig. 3, for example, is relieved, the corresponding spring 32 will disengage the head 31 of the stem 30 from the spring latches 21, and restore the piston to the position of Fig. 3.

Having thus described the invention, what is claimed is:

In a device of the class described, a casing provided intermediate its ends with cylinders and provided in its ends with enlarged bores forming shoulders at the ends of the cylinders, the casing having side outlets communicating with the bores intermediate their ends, cup shaped valve seats and guides mounted in the bores and abutting against the shoulders, the seats and guides being located inwardly of the side outlets and having outer end walls provided with central openings and with other openings arranged around the central openings, tubular closure means in the outer ends of the bores and located outwardly of the outlets, pistons slidable in the cylinders and having oppositely-projecting stems slidable in the central openings of the end walls of valve seats and guides, the pistons constituting closures for said other openings in the end walls, the tubular closure means receiving the ends of the stems, and compression springs abutting at their outer ends against the end walls of the valve seats and guides, the springs abutting at their inner ends against the pistons.

FRED BENTZ.